United States Patent Office 3,320,237
Patented May 16, 1967

3,320,237
ALKALI-METAL STARCH PHOSPHATES AND THEIR PREPARATION
Dahlia S. Greidinger and Brilliantina M. Cohen, Haifa, Israel, assignors to Chemicals & Phosphates Limited, Haifa Bay, Israel,
No Drawing. Filed July 13, 1962, Ser. No. 209,756
Claims priority, application Israel, Aug. 4, 1961, 15,869
6 Claims. (Cl. 260—233.5)

This invention concerns new alkali-metal starch phosphates, i.e. alkali-metal salts of phosphoric acid bound to the starch molecule, presumably in ester bond. These may be primary (mono-alkali-metal) or secondary (di-alkali-metal) phosphates, or mixtures of both. The invention also concerns a process for the preparation of the new alkali-metal starch phosphates.

Known kinds of alkali-metal starch phosphate contain phosphoric acid in a proportion from 1 to 5% by weight, calculated as elementary phosphorus. Their aqueous solutions are highly viscous: the viscosity of a 5% aqueous solution may be as high as 100,000 cp. They are, therefore, suitable for use in such cases where high viscosity is required or useful. They cannot be used for many other purposes for which their use would be desirable, e.g. as dirt-redeposition inhibitors.

It has been found that new alkali-metal starch phosphates containing molecularly bound phosphate in a hitherto unobtainable high proportion of 6–12%, calculated as elementary phosphorus on the weight of the alkali-metal starch phosphate, are soluble in cold water and yield low-viscosity solutions. These substances are suitable for various purposes for which the aforesaid known alkali-metal starch phosphate could not be used, e.g. as dirt-redeposition inhibitors which can be incorporated into detergent compositions, also as sequestering agents, detergent builders and protective colloids. These starch phosphates are as a rule white powders.

These new alkali-metal starch phosphates according to the invention can be prepared by a process in which a highly concentrated, preferably saturated or near-saturated alkali-metal phosphate solution having a pH of 4 to 6.5, is mixed at a temperature of 40–70° C. with an amount of starch not exceeding half the weight of the phosphate solution, the phosphate-soaked starch is separated from the solution, dried and heated at 120–170° C. for at least two hours.

In the case of sodium phosphates, appropriate concentrations of the phosphate solution are, for example, of the order of about 55 to about 65% by weight at about 50° C. according to the pH within the range of 4 to 6.5 (the lower the pH, the greater the solubility of the phosphate, hence the higher the saturation point).

The proportion of starch to phosphate solution and the time of contact of the starch with the solution required for introducing the desired proportion of phosphate molecularly bound to the starch will have to be determined by experiment for particular kinds of starch. The higher the proportion of starch, the greater the difficulties to obtain a homogeneous paste and to ensure the required intimate contact between the starch and phosphate solution.

The starch should be left in contact with the phosphate solution for a time of about 20 to about 60 minutes.

Measurements carried out with alkali-metal starch phosphates according to the invention by means of testing apparatus of the type known as "Launderometer" (trademark) have shown that such starch phosphate is at least equivalent to commercial carboxymethyl-cellulose as a dirt-redeposition inhibitor. On the other hand, the new starch phosphate is superior to carboxymethyl-cellulose as regards the solubility in water in the presence of salts, which allows the starch phosphate to be incorporated with concentrated liquid detergent composition even in cases where the incorporation of carboxymethyl-cellulose is difficult.

The invention is illustrated by the following examples to which it is not limited.

Example 1

31.2 g. of $NaH_2PO_4 \cdot 2H_2O$ were dissolved in 20 ml. of water at 80–100° C. The solution was allowed to cool to about 55° C., at which temperature the solution was nearly saturated. This concentration corresponds to 55% by weight, calculated as anhydrous $NaH_2PO_4$, while the saturation concentration of this salt at room temperature (about 20° C.) is about 45% by weight. 18 g. of corn starch were introduced into the solution. The slurry thus formed was stirred at 40–50° C. for 30 minutes. The soaked starch was filtered off, the filter cake was dried and thereafter heated, preferably in vacuo, for 6 hours at 150–155° C. The sodium starch phosphate thus produced contained 7.9% of molecularly bound phosphate calculated as elementary phosphorus on the weight of the starch phosphate.

Example 2

23.4 g. of $NaH_2PO_4 \cdot 2H_2O$ and 13.4 g. of $$Na_2HPO_4 \cdot 7H_2O$$

were dissolved in 18 ml. of water at 80–100° C. The concentration of the solution was 47%, calculated as anhydrous salts. At room temperature (about 20° C.) the saturation concentration of $NaH_2PO_4$ is about 45%, that of $Na_2HPO_4$ about 7.3%, and that of the salt mixture is intermediate between these values. The solution was allowed to cool to about 55° C. and 18 g. corn starch were introduced. The reaction mixture was worked up as in Example 1, except that the dried filter cake was heated during 10 hours. The sodium starch phosphate thus produced contained 9.6% of molecularly bound phosphate.

Example 3

90 g. of $NaH_2PO_4 \cdot 2H_2O$ were dissolved in 36 ml. of 0.1 N NaOH at 60° C, corresponding to a phosphate concentration (calculated as anhydrous salt) of 56%, and 36 g. of corn starch were added to the solution and the mixture was kept at 50–60° C. for 30 minutes. The soaked starch was filtered off, dried and heated at 140° C. in a vacuum oven for 2 hours. The starch phosphate thus produced contained 9.0% of molecularly bound phosphate.

We claim:
1. A process for the preparation of a starch phosphate containing 6–12% of phosphorous comprising mixing at a temperature of 40–70° C. an aqueous alkali metal phosphate solution having a pH of 4–6.5 and a concentration above the saturation concentration at room temperature with an amount of starch not exceeding half the weight of the phosphate solution, separating the phosphate-soaked starch from the solution, drying the product and then heating the dried product to 120–170° C. for at least two hours.

2. A process according to claim 1, wherein the alkali metal phosphate solution is prepared by dissolving monosodium phosphate ($NaH_2PO_4 \cdot 2H_2O$) in water at 80–100° C. in an amount corresponding to 31.2 g. of the phosphate per 20 ml. of water, cooling the resultant solution to about 55° C. and, at this temperature, effecting said mixing with the starch.

3. A process according to claim 1, wherein monosodium phosphate ($NaH_2PO_4 \cdot 2H_2O$) and disodium phosphate ($NaH_2HPO_4 \cdot 7H_2O$) are dissolved in water at a temperature of 80–100° C. in an amount corresponding to 23.4 g. of the monosodium phosphate and 13.4 g. of the disodium phosphate per 18 ml. of water, cooling the solution to about 55° C. and, at this temperature, effecting said mixing with the starch.

4. A process according to claim 1, wherein a solution of monosodium phosphate ($NaH_2PO_4 \cdot 2H_2O$) in dilute aqueous sodium hydroxide is prepared at a temperature of 60° C. in an amount corresponding to 90 g. of monosodium phosphate per 36 ml. of aqueous sodium hydroxide of a concentration of 0.1 N, and said mixing with the starch is effected at a temperature from 50–60° C.

5. Starch phosphate containing 6–12% of phosphorus, calculated on the dry weight of the starch phosphate, said phosphorus being in the form of molecularly bound phosphate, and said starch phosphate being of low viscosity in aqueous solution.

6. Low-viscosity aqueous solutions of starch phosphates which starch phosphates contain 6–12% of phosphorus, calculated on the dry weight of the starch phosphate, in the form of molecularly bound phosphate.

References Cited by the Examiner
UNITED STATES PATENTS

| | | | |
|---|---|---|---|
| 2,801,242 | 7/1957 | Kerr et al. | 260—233.5 |
| 2,824,870 | 2/1958 | Newkom | 260—233.5 |
| 2,865,762 | 12/1958 | Newkom | 260—233.5 |
| 2,884,412 | 4/1959 | Newkom | 260—233.5 |
| 3,000,830 | 9/1961 | Fong et al. | 252—117 |
| 3,060,171 | 10/1962 | Sietsema | 260—233.5 |
| 3,061,551 | 10/1962 | Rutenberg et al. | 252—117 |

DONALD E. CZAJA, *Primary Examiner.*

LEON J. BERCOVITZ, *Examiner.*

R. W. MULCAHY, A. T. MEYERS,
*Assistant Examiners.*